US012695156B2

(12) United States Patent
Okano

(10) Patent No.: US 12,695,156 B2
(45) Date of Patent: Jul. 28, 2026

(54) LITHIUM SECONDARY BATTERY

(71) Applicant: PANASONIC INTELLECTUAL PROPERTY MANAGEMENT CO., LTD., Osaka (JP)

(72) Inventor: Tetsuyuki Okano, Osaka-fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 799 days.

(21) Appl. No.: 17/912,127

(22) PCT Filed: Feb. 4, 2021

(86) PCT No.: PCT/JP2021/004043
§ 371 (c)(1),
(2) Date: Sep. 16, 2022

(87) PCT Pub. No.: WO2021/192645
PCT Pub. Date: Sep. 30, 2021

(65) Prior Publication Data
US 2023/0187785 A1      Jun. 15, 2023

(30) Foreign Application Priority Data
Mar. 27, 2020    (JP) ................................. 2020-058192

(51) Int. Cl.
*H01M 50/477*        (2021.01)
*H01M 4/38*          (2006.01)
(Continued)

(52) U.S. Cl.
CPC ......... *H01M 50/477* (2021.01); *H01M 4/382* (2013.01); *H01M 10/052* (2013.01);
(Continued)

(58) Field of Classification Search
CPC .. H01M 50/477; H01M 4/382; H01M 10/052; H01M 4/0428; H01M 4/0423;
(Continued)

(56) References Cited

U.S. PATENT DOCUMENTS

2013/0059192 A1    3/2013  Kajita et al.
2014/0308582 A1   10/2014  Satow et al.
(Continued)

FOREIGN PATENT DOCUMENTS

CN        104025342 A      9/2014
CN        205985153 U      2/2017
(Continued)

OTHER PUBLICATIONS

Office Action dated Jan. 24, 2025, issued in counterpart CN Application No. 202180024555.8, with partial English translation. (11 pages).
(Continued)

*Primary Examiner* — Mark Ruthkosky
(74) *Attorney, Agent, or Firm* — WHDA, LLP

(57)                    ABSTRACT
A lithium secondary battery includes a positive electrode, a negative electrode, a separator disposed between the positive electrode and the negative electrode, and a non-aqueous electrolyte having lithium ion conductivity. Lithium metal is deposited on the negative electrode during charging, and dissolves from the negative electrode during discharging. A spacer is provided between the separator and at least one of the positive electrode and the negative electrode. A first length of the separator in a first direction D1 is shorter than a second length of the separator in a second direction D2 intersecting the first direction D1. In a cross section of the spacer taken along a thickness direction of the separator and the first direction D1, at least one of a spacer-side angle between the separator and the spacer and a spacer-side angle between the spacer and the electrode in contact with the spacer is greater than 90°.

18 Claims, 10 Drawing Sheets

(51) Int. Cl.
    *H01M 10/052*      (2010.01)
    *H01M 10/0568*      (2010.01)
    *H01M 50/463*      (2021.01)

(52) U.S. Cl.
    CPC ..... *H01M 10/0568* (2013.01); *H01M 50/463* (2021.01); *H01M 2300/0037* (2013.01)

(58) Field of Classification Search
    CPC .. H01M 4/0421; H01M 6/168; H01M 6/5022; H01M 10/0568; H01M 50/463; H01M 2300/0037; H01M 50/474; H01M 4/0407; Y02E 60/10; Y02P 70/50
    See application file for complete search history.

(56)           References Cited

U.S. PATENT DOCUMENTS

| | | | |
|---|---|---|---|
| 2018/0337394 A1 | 11/2018 | Matsui et al. | |
| 2018/0337395 A1 | 11/2018 | Matsui et al. | |
| 2021/0265617 A1* | 8/2021 | Okano | H01M 50/474 |
| 2023/0187785 A1* | 6/2023 | Okano | H01M 10/0568 |
| | | | 429/199 |
| 2023/0361431 A1* | 11/2023 | Okano | H01M 10/4235 |

FOREIGN PATENT DOCUMENTS

| | | | |
|---|---|---|---|
| CN | 108963321 A | 12/2018 | |
| JP | S59-181587 U | 12/1984 | |
| JP | H03-091663 U | 9/1991 | |
| JP | H10-012279 A | 1/1998 | |
| JP | 2000-268813 A | 9/2000 | |
| JP | 2011-008929 A | 1/2011 | |
| JP | 2013-137984 A | 7/2013 | |
| JP | 2016-115393 A | 6/2016 | |

OTHER PUBLICATIONS

International Search Report dated Apr. 13, 2021, issued in counterpart Application No. PCT/JP2021/004043, with English Translation. (9 pages).
Office Action dated Oct. 22, 2024, issued in counterpart JP Application No. 2022-509353. (11 pages).

\* cited by examiner

LITHIUM SECONDARY BATTERY

CROSS-REFERENCE TO RELATED APPLICATION

This application is a National Phase Application filed under 35 U.S.C. § 371 of International Application No. PCT/JP2021/004043 filed on Feb. 4, 2021 which claims the benefit of priorities under 35 U.S.C. § 119(a) of Japanese Patent Application No. 2020-058192 filed in Japan on Mar. 27, 2020, the contents of which are incorporated herein by reference.

TECHNICAL FIELD

The present disclosure relates to a lithium secondary battery in which lithium metal is used as a negative electrode active material.

BACKGROUND ART

Lithium ion batteries are known as high-capacity non-aqueous electrolyte secondary batteries. The capacity of a lithium ion battery can be improved by, for example, using graphite and an alloy-type active material, such as a silicon compound, in combination as a negative electrode active material. However, the improvement in capacity of a lithium ion battery is approaching the limit.

Lithium secondary batteries (lithium metal secondary batteries) are promising as non-aqueous electrolyte secondary batteries superior in capacity to lithium ion batteries. In a lithium secondary battery, lithium metal is deposited on the negative electrode during charging, and the lithium metal dissolves and is released as lithium ions into the non-aqueous electrolyte during discharging.

Patent Literature 1 proposes forming a gap for storing lithium deposited on the surface of the negative electrode by providing a spacer between the negative electrode or the positive electrode and a separator. Patent Literature 2 proposes providing a spacer to mitigate stress generated through expansion and contraction of the negative electrode.

CITATION LIST

Patent Literature

[PTL 1] Japanese Laid-Open Patent Publication No. H10-12279
[PTL 2] Japanese Laid-Open Patent Publication No. 2011-8929

SUMMARY OF INVENTION

With the methods described in Patent Literature 1 and 2, the capacity retention rate tends to decrease.

The present disclosure relates to a lithium secondary battery including: a positive electrode, a negative electrode, a separator disposed between the positive electrode and the negative electrode; and a non-aqueous electrolyte having lithium ion conductivity, wherein lithium metal is deposited on the negative electrode during charging, and dissolves from the negative electrode during discharging, a spacer is provided between the separator and at least one of the positive electrode and the negative electrode, a first length of the separator in a first direction D1 is shorter than a second length of the separator in a second direction D2 intersecting the first direction D1, and in a cross section of the spacer taken along a thickness direction of the separator and the first direction D1, at least one of a spacer-side angle between the separator and the spacer and a spacer-side angle between the spacer and the electrode in contact with the spacer is greater than 90°.

According to the present disclosure, a capacity retention rate of a lithium secondary battery can be improved.

DESCRIPTION OF EMBODIMENTS

Figure 1:
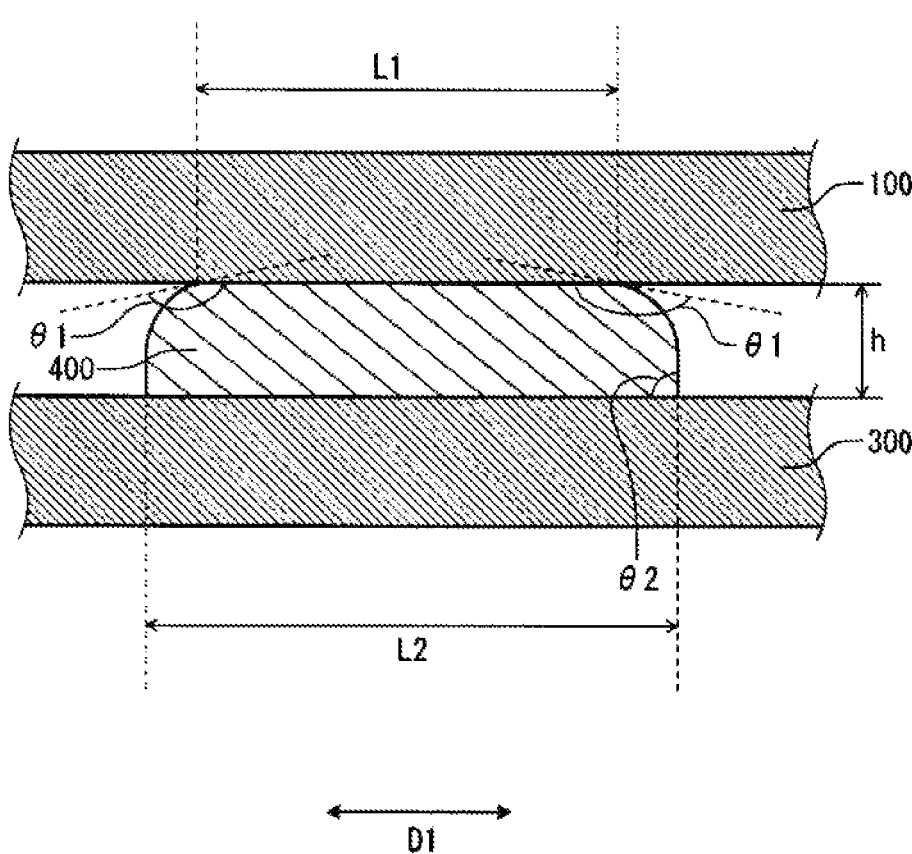
FIG. 1 A schematic cross-sectional view of an essential part of a lithium secondary battery according to one embodiment of the present disclosure.

A lithium secondary battery according to the present disclosure includes a positive electrode, a negative electrode, a separator disposed between the positive electrode and the negative electrode, and a non-aqueous electrolyte having lithium ion conductivity. In the lithium secondary battery, lithium metal is deposited on the negative electrode during charging, and dissolves from the negative electrode during discharging. A spacer is provided between the separator and at least one of the positive electrode and the negative electrode (hereinafter may be collectively referred to as electrodes).

Stress is applied to the spacer through expansion and contraction of the negative electrode. The stress is likely to be concentrated particularly on corner portions of the spacer. Accordingly, portions of the electrode that are in contact with the corner portions of the spacer are likely to be damaged. Moreover, in a case where the corner portions of the spacer come into contact with the separator, the separator presses the spacer back toward the electrode in reaction to the stress. Consequently, the electrode is damaged. The damage to the electrode increases as charge-discharge cycles progress, and may reduce the capacity retention rate.

The spacer according to the present disclosure comes into contact with the electrode or the separator at an angle greater than 90°. Accordingly, concentration of stress on the corner portions is mitigated, and damage to the electrode is suppressed.

[Spacer]

The spacer is provided between an electrode and the separator. The spacer forms a space between the electrode and the separator, and deposited lithium metal can be stored in the space. The spacer reduces a change in the volume of the negative electrode that occurs due to deposition of the lithium metal.

In a cross section (hereinafter referred to as a "reference cross section") of the spacer taken along a thickness direction of the separator and a first direction D1, at least one angle (hereinafter referred to as an "angle θ") out of a spacer-side angle (hereinafter referred to as a "first angle θ1") between the spacer and the electrode in contact with the spacer and a spacer-side angle (hereinafter referred to as a "second angle θ2") between the spacer and the separator is greater than 90°. With this configuration, concentration of stress on corner portions is mitigated, and damage to the electrode is suppressed. The angle θ is preferably 100° or more, and more preferably 130° or more. The angle θ is less than 180°. The angle θ is preferably 175° or less, more preferably 170° or less, and particularly preferably 150° or less. The angle θ is the average value of angles θ in different reference cross sections taken at five positions. The first angle θ1 and the second angle θ2 are each determined in the same manner.

Preferably, at least one first angle θ1 between the electrode and the spacer is greater than 90°. In this case, damage to the electrode is more likely to be suppressed. Particularly preferably, at least one first angle θ1 between the positive electrode and the spacer is greater than 90°. Further preferably, all first angles θ1 between the electrode and the spacer are greater than 90°. Particularly preferably, all first angles θ1 between the positive electrode and the spacer are greater than 90°.

The first direction D1 of the separator is a direction extending along a short side of the separator. That is, a first length of the separator in the first direction D1 is shorter than a second length of the separator in a second direction D2 intersecting the first direction D1. The separator may have a long rectangular shape, i.e., a belt-like shape, for example. The angle between the first direction D1 and the second direction D2 is only required to be substantially 90°, and may be 88° to 92°, for example.

There is no particular limitation on the contact length between the spacer and the separator and the contact length between the spacer and the electrode in the reference cross section. The contact lengths are set as appropriate according to the first length. Each of the contact lengths in the reference cross section is, for example, 500 μm or more and 2000 μm or less. If the contact lengths are within this range, stress applied to the spacer is likely to be uniformly dispersed to the separator and the electrode. Each of the contact lengths is the average value of contact lengths in different reference cross sections taken at five positions.

There is no particular limitation on the height of the spacer in the reference cross section. The height of the spacer can be determined according to the deposition amount of lithium metal. The height of the spacer is, for example, 10 μm or more and 60 μm or less. If the height of the spacer is within this range, it is possible to further increase the effect of absorbing a change in the volume of the negative electrode that occurs due to deposition of lithium metal. Moreover, lithium metal deposited on the surface of the negative electrode is appropriately pressed by the separator and electric conductivity between the lithium metal and the negative electrode is increased, and accordingly, charge-discharge efficiency can be increased. The height of the spacer is the average value of maximum heights of the spacer in different reference cross sections taken at five positions.

There is no particular limitation on the material of the spacer. The spacer is made of an electrically conductive material and/or an electrically insulating material.

The electrically conductive material can be selected as appropriate from materials described later as the material of a negative electrode current collector or a positive electrode current collector. Such a spacer may be provided by forming a protrusion on the current collector through pressing or the like. Alternatively, an electrically conductive coating material may be applied to the surface of the separator or the electrode, or an electrically conductive tape may be affixed to the surface of the separator or the electrode.

The insulating material may be a resin material, for example. Examples of the resin material include a polyolefin resin, an acrylic resin, a polyamide resin, a polyimide resin, a silicone resin, a fluorocarbon resin, a urethane resin, a melamine resin, and a urea resin. The resin material may be a cured product of a curable resin such as an epoxy resin. These resin materials may be mixed with an inorganic filler or the like.

In particular, insulating materials are preferred. Lithium metal is unlikely to be deposited on surfaces of insulating materials. Therefore, it is possible to increase an effect of suppressing expansion of the negative electrode.

It is desirable that the material of the spacer has a Young's modulus of 0.01 GPa or more and 10 GPa or less. In this case, stress generated through expansion and contraction of the negative electrode is likely to be mitigated, and the space for storing lithium metal is likely to be maintained. Additionally, damage caused to the electrode by the spacer is likely to be suppressed. An example of insulating materials having a Young's modulus within the above range is the above-described cured product of a curable resin.

The spacer can be formed by, for example, affixing a resin adhesive tape to the surface of the separator or the electrode. Alternatively, the spacer may be formed by applying a solution or dispersion including a resin material to the surface of the separator or the electrode, followed by drying. The spacer may be formed by applying a curable resin in a desired shape to the surface of the separator or the electrode, followed by curing. Alternatively, the spacer may be formed by scattering particles of a resin material in a desired shape on the surface of the separator or the electrode. Among these, the method of using a solution including a resin material and the method of using particles of a resin material are preferred in order to easily form an angle θ greater than 90°.

The reference cross section of the spacer preferably includes a curved line that is in contact with at least either the separator or the electrode. In this case, the contact angle of the spacer is likely to become larger.

In a case where the reference cross section of the spacer includes a curved line that is in contact with the electrode, the first angle θ1 is a spacer-side angle between the surface of the electrode and the tangent at an intersection between the curved line and the electrode. In this case, the first angle θ1 is greater than 90°. The second angle θ2 is not particularly limited. The second angle θ2 may be 90°.

In a case where the reference cross section of the spacer includes a curved line that is in contact with the separator, the second angle θ2 is a spacer-side angle between the surface of the separator and the tangent at an intersection between the curved line and the separator. In this case, the second angle θ2 is greater than 90°. The first angle θ1 is not particularly limited. The first angle θ1 may be 90°.

In order to further increase the contact angle of the spacer, it is preferable that the curved line has a large radius of curvature at the intersection between the curved line and the separator or the electrode. The radius of curvature may be, for example, greater than or equal to half the longer contact length out of the contact length between the electrode and the spacer and the contact length between the separator and the spacer, or greater than or equal to the longer contact length, or greater than or equal to twice the longer contact length.

In the reference cross section, the contact length between the electrode and the spacer may be different from the contact length between the separator and the spacer. In this case as well, the contact angle of the spacer is likely to be larger. Furthermore, the spacer can have a slope connecting the electrode and the separator in the reference cross section. Therefore, the electrode and the separator are unlikely to be displaced relative to each other on opposite sides of the spacer, and damage to the electrode is more likely to be suppressed. The contact length between the separator and the spacer is preferably longer than the contact length between the electrode and the spacer. In this case, the contact angle of the spacer relative to the electrode is large, and damage to the electrode is more likely to be suppressed.

One of the contact lengths will be referred to as a "length L1", and the other contact length that is longer than the length L1 will be referred to as a "length L2". A ratio L1/L2 between the length L1 and the length L2 is preferably 0.5 or more and 0.95 or less, and more preferably 0.8 or more and 0.95 or less. In this case, even the member having the shorter contact length can be in contact with the spacer over a certain area. Accordingly, stress applied from the spacer is dispersed, and damage to the electrode is more likely to be suppressed.

In order to further suppress displacement of the electrode and the separator relative to each other, the shape of the spacer in the reference cross section is preferably line symmetrical or approximately line symmetrical with respect to a straight line extending along the thickness direction of the separator.

There is no particular limitation on the shape of the spacer in the reference cross section. The shape of the spacer in the reference cross section is, for example, a rectangle including a curved line forming at least one corner, a trapezoid, an ellipse, a portion of an ellipse, or a shape similar to any of these. The term "ellipse" encompasses a perfect circle.

The following describes preferred shapes of the spacer in the reference cross section with reference to drawings as appropriate. Illustrated examples are shapes of the spacer in the reference cross section. In the illustrated examples, at least one first angle θ1 between the electrode and the spacer is greater than 90°. However, embodiments of the present disclosure are not limited to such a configuration, and a configuration is also possible in which at least one second angle θ2 between the separator and the spacer is greater than 90°.

First Embodiment

A spacer according to the present embodiment has a rectangular shape including a curved line forming at least one corner in the reference cross section. In this case, the radius of curvature of the curved line is preferably greater than or equal to three times the longer contact length out of the contact length between the electrode and the spacer and the contact length between the separator and the spacer.

FIG. 1 is a schematic cross-sectional view of an essential part of a lithium secondary battery according to one embodiment of the present disclosure. A spacer 400 is provided between an electrode 100 and a separator 300. The spacer 400 has a substantially rectangular shape including rounded corners on the electrode 100 side in the reference cross section. The spacer 400 includes curved lines that are in contact with the electrode 100. Accordingly, the first angle θ1 is greater than 90°. The second angle θ2 is about 90°.

A contact length L1 between the electrode 100 and the spacer 400 is different from a contact length L2 between the separator 300 and the spacer 400. The contact length L1 is shorter than the contact length L2. The ratio L1/L2 between the length L1 and the length L2 is 0.5 or more and 0.95 or less. The radius of curvature of the curved lines at intersections between the electrode 100 and the curved lines is greater than or equal to three times the contact length L2 between the separator 300 and the spacer 400.

Second Embodiment

A spacer according to the present embodiment has a trapezoidal shape in the reference cross section. The contact length L1 between the electrode and the spacer is different from the contact length L2 between the separator and the spacer. The ratio L1/L2 between the length L1 and the length L2 is preferably 0.5 or more and 0.95 or less.

Figure 2A:
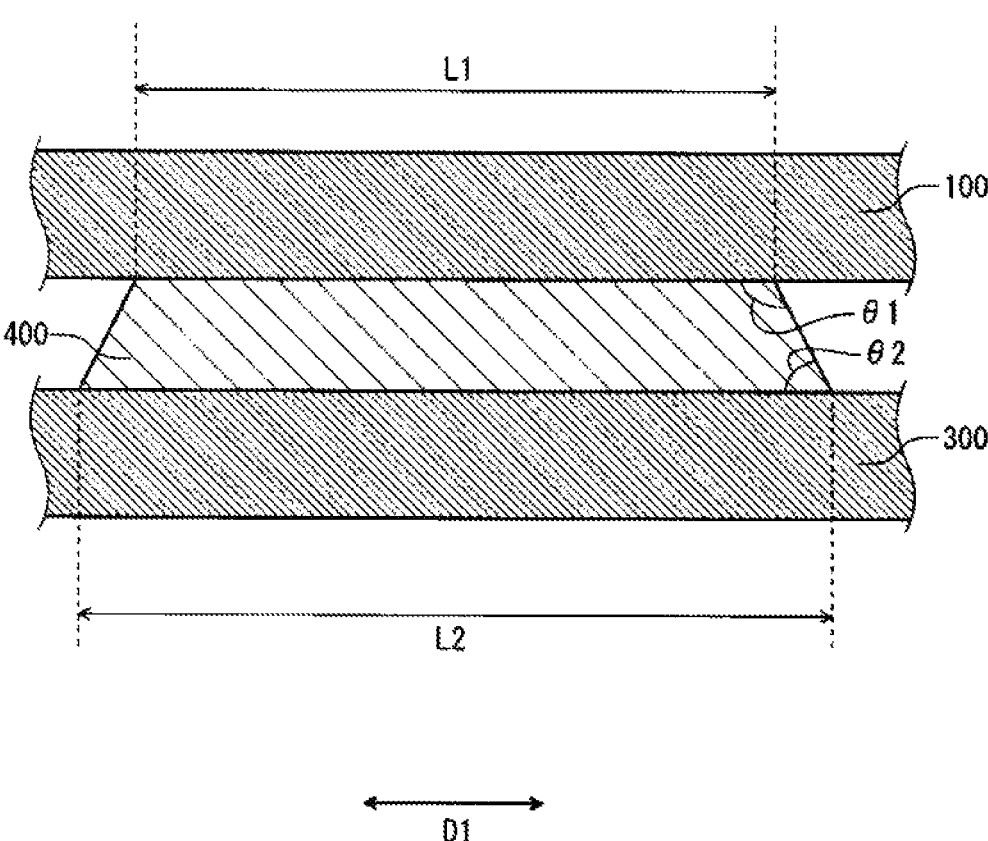
FIG. 2A A schematic cross-sectional view of an essential part of another lithium secondary battery according to one embodiment of the present disclosure.

FIG. 2A is a schematic cross-sectional view of an essential part of another lithium secondary battery according to one embodiment of the present disclosure. The spacer 400 is provided between the electrode 100 and the separator 300. The spacer 400 has a trapezoidal shape in the reference cross section. The contact length L1 between the electrode 100 and the spacer 400 is shorter than the contact length L2 between the separator 300 and the spacer 400. The ratio L1/L2 between the length L1 and the length L2 is 0.5 or more and 0.95 or less. The spacer 400 includes two slopes connecting the electrode 100 and the separator 300. Accordingly, two first angles θ1 are both greater than 90°. Two second angles θ2 are both smaller than 90°.

Figure 2B:
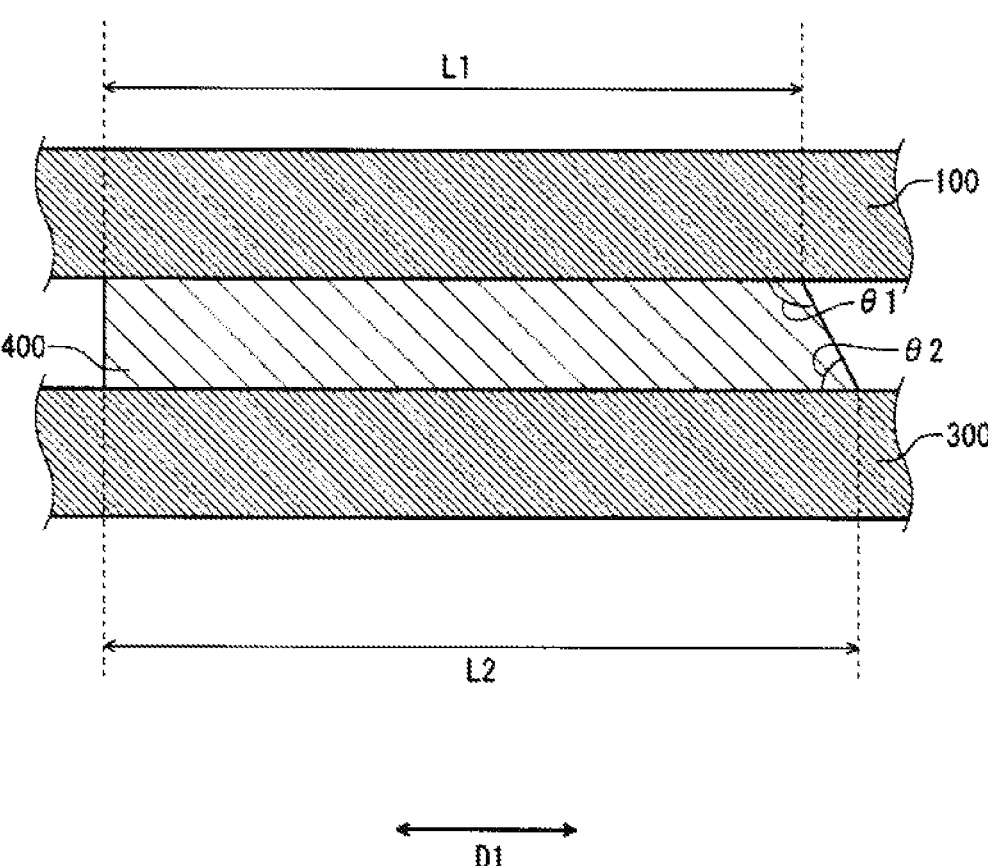
FIG. 2B A schematic cross-sectional view of an essential part of another lithium secondary battery according to one embodiment of the present disclosure.

FIG. 2B is a schematic cross-sectional view of an essential part of another lithium secondary battery according to one embodiment of the present disclosure. The spacer 400 is provided between the electrode 100 and the separator 300. The spacer 400 has a trapezoidal shape in the reference cross section. The contact length L1 between the electrode 100 and the spacer 400 is shorter than the contact length L2 between the separator 300 and the spacer 400. The ratio L1/L2 between the length L1 and the length L2 is 0.5 or more and 0.95 or less. The spacer 400 includes a slope connecting the electrode 100 and the separator 300. That is, one of two first angles θ1 is greater than 90°, and the other first angle θ1 is 90°. One of two second angles θ2 is smaller than 90°, and the other second angle θ2 is 90°.

Third Embodiment

A spacer according to the present embodiment has the shape of a portion of an ellipse in the reference cross section.

Among the positive electrode, the negative electrode, and the separator, the member that is in contact with an arc of the spacer will be referred to as a "first member", and the member that is in contact with a chord of the spacer will be referred to as a "second member".

A spacer-side angle between the second member and the tangent of the arc at an intersection between the arc and the second member will be referred to as a "contact angle $\theta$", and a spacer-side angle between the second member and a straight line connecting the intersection and the middle point in a contact portion between the first member and the spacer will be referred to as an "elevation angle $\theta e$". The contact angle $\theta$ and the elevation angle $\theta e$ satisfy a relationship of $\theta \geq 2 \times \theta e$, for example. In this case, an angle between the first member and the spacer is sufficiently large.

The height h of the spacer is expressed as: (distance between the intersection of the arc and second member and the intersection between the second member and a vertical line, which makes a right angle with the second member, drawn from the middle point in the contact portion between the first member and the spacer)$\times \tan \theta e$. Accordingly, the elevation angle $\theta e$ is set within a range in which the height h of the spacer is 10 µm or more and 60 µm or less.

In the reference cross section, the maximum diameter L3 of the spacer in a direction extending along the surface of the separator may be 500 µm or more and 2000 µm or less. In this case, the space for storing lithium metal is likely to be maintained. The maximum diameter L3 may be greater than the contact length between the separator and the spacer and the contact length between the electrode and the spacer.

Figure 3A:
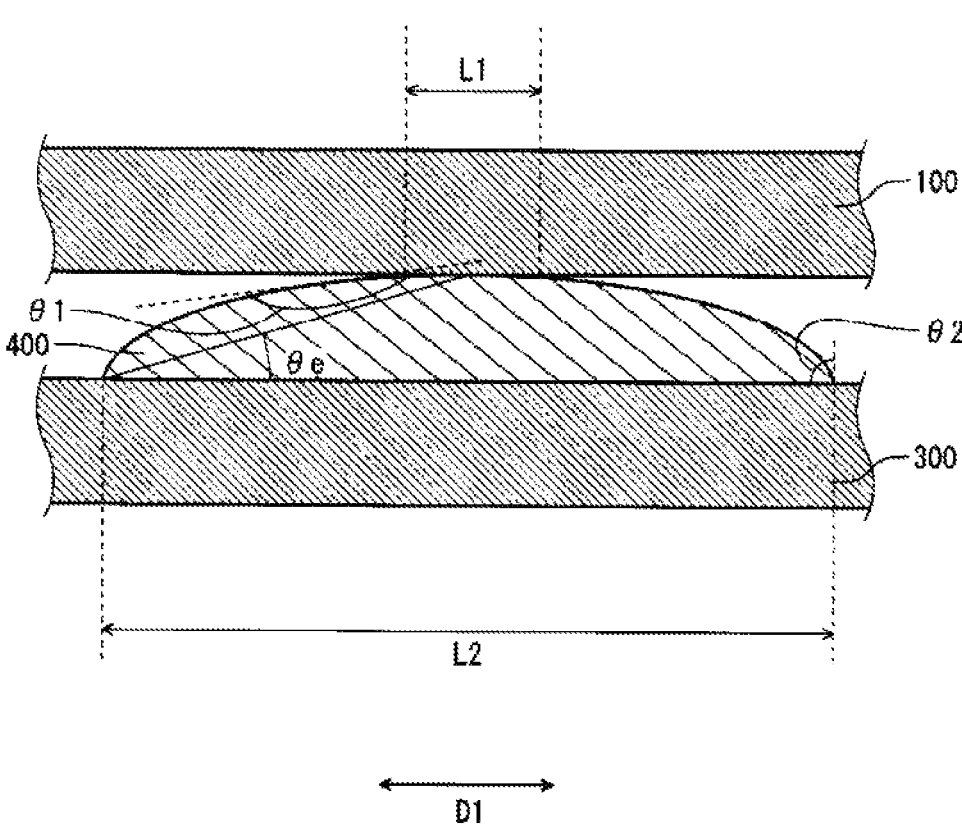
FIG. 3A A schematic cross-sectional view of an essential part of another lithium secondary battery according to one embodiment of the present disclosure.

FIG. 3A is a schematic cross-sectional view of an essential part of a lithium secondary battery according to one embodiment of the present disclosure. The spacer 400 is provided between the electrode 100 and the separator 300. The spacer 400 has the shape of a portion of an ellipse including an arc and a chord in the reference cross section. The cross-sectional shape of the spacer 400 is like one of two halves of the ellipse divided along its long axis. The arc of the spacer 400 is in contact with the electrode 100, and the chord of the spacer 400 is in contact with the separator 300.

Since the arc of the spacer 400 is in contact with the electrode 100, the first angle $\theta 1$ is greater than 90°. The second angle $\theta 2$ is about 90°. The contact angle $\theta$ and the elevation angle $\theta e$ satisfy the relationship of $\theta \geq 2 \times \theta e$.

The contact length L1 between the electrode 100 and the spacer 400 is different from the contact length L2 between the separator 300 and the spacer 400. The contact length L1 between the electrode 100 and the spacer 400 is shorter than the contact length L2 between the separator 300 and the spacer 400. The ratio L1/L2 between the length L1 and the length L2 is 0.5 or more and 0.95 or less. The maximum diameter L3 of the spacer is equal to the length L2.

Figure 3B:
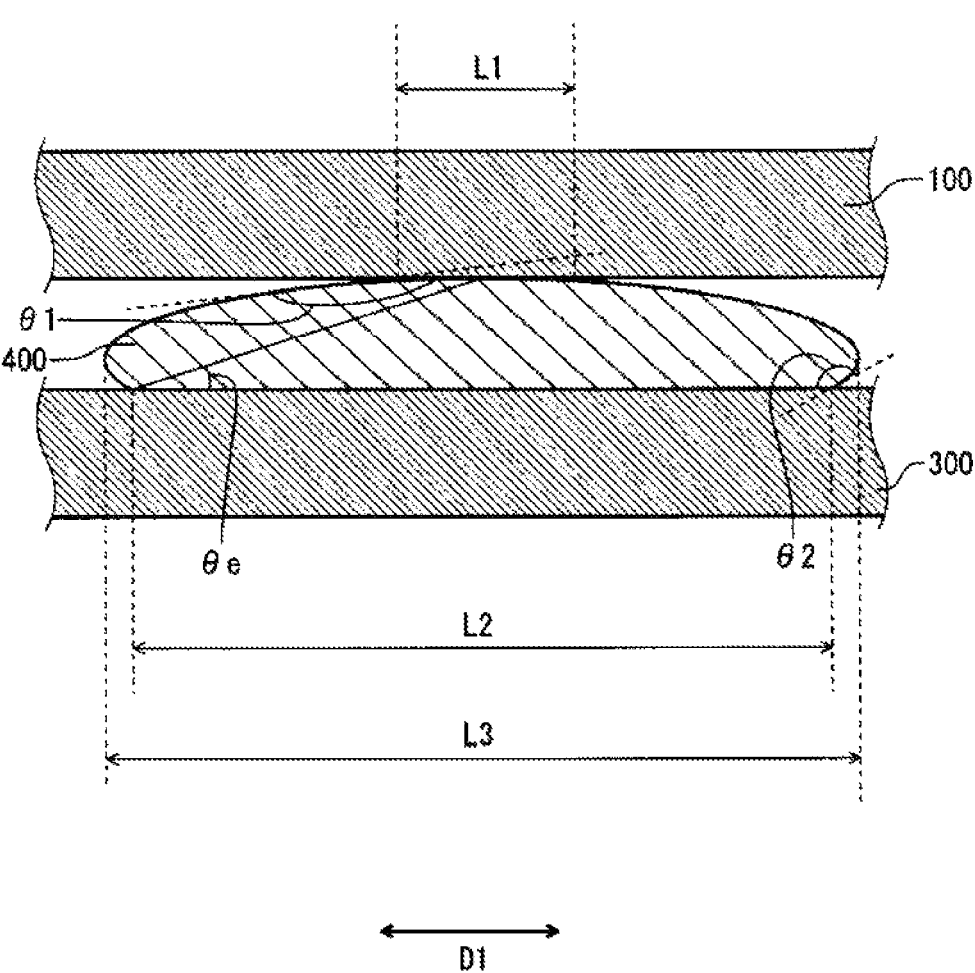
FIG. 3B A schematic cross-sectional view of an essential part of another lithium secondary battery according to one embodiment of the present disclosure.

FIG. 3B is a schematic cross-sectional view of an essential part of a lithium secondary battery according to one embodiment of the present disclosure. The spacer 400 is provided between the electrode 100 and the separator 300. The spacer 400 has the shape of a portion of an ellipse including an arc and a chord in the reference cross section. The cross-sectional shape of the spacer 400 is like a portion of the ellipse cut along a line that does not pass through the center of the ellipse and extends along the long axis. The arc of the spacer 400 is in contact with the electrode 100, and the chord of the spacer 400 is in contact with the separator 300.

Since the arc of the spacer 400 is in contact with the electrode 100, the first angle $\theta 1$ is greater than 90°. The second angle $\theta 2$ is also greater than 90°. The contact angle $\theta$ and the elevation angle $\theta e$ satisfy the relationship of $\theta \geq 2 \times \theta e$.

The contact length L1 between the electrode 100 and the spacer 400 is different from the contact length L2 between the separator 300 and the spacer 400. The contact length L1 between the electrode 100 and the spacer 400 is shorter than the contact length L2 between the separator 300 and the spacer 400. The ratio L1/L2 between the length L1 and the length L2 is 0.5 or more and 0.95 or less. The maximum diameter L3 of the spacer is longer than the length L2.

Fourth Embodiment

A spacer according to the present embodiment has a trapezoidal shape including a curved line forming at least one corner in the reference cross section. However, the trapezoidal shape is formed by a plurality of particles stacked on each other. There is no particular limitation on the shape and particle diameter of the particles. Each particle has, for example, an elliptical shape in the reference cross section. The particles may have the same shape and the same particle diameter, or different shapes and different particle diameters. In a case where the spacer is formed by combining a plurality of members as in this case, the cross-sectional shape of the spacer is determined by drawing a line that surrounds the plurality of members.

The curved line preferably has a radius of curvature that is greater than or equal to three times the longer contact length out of the contact length between the electrode and the spacer and the contact length between the separator and the spacer. The contact length L1 between the electrode and the spacer is different from the contact length L2 between the separator and the spacer. The ratio L1/L2 between the length L1 and the length L2 is preferably 0.5 or more and 0.95 or less.

Figure 4:
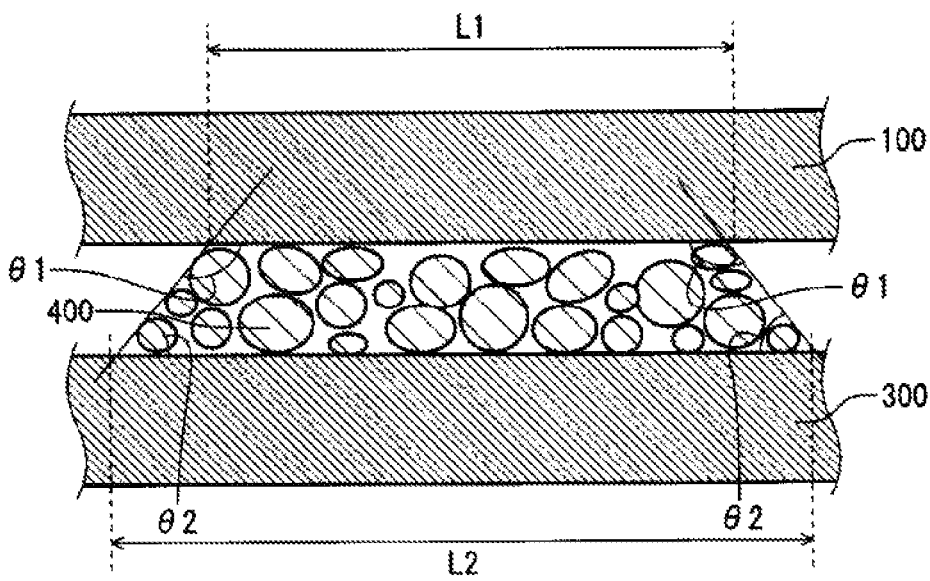
FIG. 4 A schematic cross-sectional view of an essential part of another lithium secondary battery according to one embodiment of the present disclosure.

FIG. 4 is a schematic cross-sectional view of an essential part of a lithium secondary battery according to one embodiment of the present disclosure. The spacer 400 is provided between the electrode 100 and the separator 300. The spacer 400 has a substantially trapezoidal shape including rounded corner portions on the electrode 100 side and the separator 300 side in the reference cross section. The spacer 400 is formed by a plurality of particles having different particle diameters and stacked on each other. Each particle has a substantially elliptical shape. The spacer 400 includes curved lines that are in contact with the electrode 100. Accordingly, the first angle $\theta 1$ is greater than 90°. The spacer 400 includes curved lines that are in contact with the separator 300. Accordingly, the second angle $\theta 2$ is also greater than 90°. The radius of curvature of each of the curved lines at an intersection between the curved line and the electrode 100 or the separator 300 is greater than or equal to three times the longer contact length out of the contact length L1 between the electrode and the spacer and the contact length L2 between the separator and the spacer.

The contact length L1 between the electrode 100 and the spacer 400 is different from the contact length L2 between the separator 300 and the spacer 400. The ratio L1/L2 between the length L1 and the length L2 is 0.5 or more and 0.95 or less.

There is no particular limitation on the arrangement of the spacer. In particular, the spacer is preferably arranged such that it is possible to draw a straight line SL extending along the first direction D1 and crossing the spacer at three or more points (preferably, four or more points, and further preferably, five or more points) when viewed in a normal direction of a main surface of the separator. In this case, lithium metal is unlikely to be deposited ununiformly or dendritically on the negative electrode. Furthermore, local expansion of the negative electrode is suppressed, and accordingly, the electrode is unlikely to be damaged. Additionally, the spacer supports the separator and the electrode at many points, and stress is applied relatively uniformly from the spacer to the separator and the electrode. Therefore, damage to the electrode is further suppressed. Furthermore, pressing force can be applied more uniformly from the separator to the entirety of the deposited lithium metal. Therefore, lithium metal is more likely to be deposited along the surface of the negative electrode.

When viewed in the normal direction of the main surface of the separator, a ratio d/h between the minimum distance d (μm) between adjacent portions of the spacer on the straight line SL and the height h (μm) of the spacer is, for example, 10 or more and 800 or less, and may be 40 or more and 400 or less. If the ratio d/h is controlled to fall within this range, a necessary and sufficient space for storing lithium metal is likely to be secured. Furthermore, pressing force can be applied more uniformly from the separator to the entirety of the deposited lithium metal. The minimum distance d between adjacent portions of the spacer can be determined by measuring the minimum distance at a point on each of arbitrarily selected 10 straight lines SL and calculating the average value of the measured values.

When viewed in the normal direction of the main surface of the separator, a ratio s/S between an area S of a region in which the positive electrode and the negative electrode face each other and an area s of the spacer arranged in the region in which the positive electrode and the negative electrode face each other is 0.05 or more and 0.2 or less, for example. If the ratio of the area s is controlled to fall within this range, pressing force can be applied more uniformly from the separator to the entirety of the deposited lithium metal. Furthermore, it is possible to reduce resistance to electrode reaction.

When viewed in the normal direction of the main surface of the separator, a ratio l/L of a length l of portions of the straight line SL occupied by the spacer to the first length L is 0.05 or more and 0.2 or less, for example. In this case, pressing force can be applied more uniformly from the separator to the entirety of the deposited lithium metal. The length l can be determined by measuring the length l for each of arbitrarily selected 10 straight lines SL and calculating the average value of the measured values.

The spacer may be constituted by, for example, a plurality of line-shaped protrusions arranged in stripes along the second direction on the surface of the electrode or the separator. For example, a protrusion extending along the second direction D2 may be provided at each of two ends in the first direction D1 on the surface of the separator, and a protrusion extending along the second direction D2 may be provided midway between the two ends (three protrusions in total). In this case, it is possible to draw a straight line SL crossing the spacer at three points in total, namely two points at the two ends and a point between the two ends. Such a spacer constituted by a plurality of line-shaped protrusions can be relatively easily formed on the surface of the separator or the electrode. Furthermore, it is easy to control parameters such as the height h, the ratio d/h, the ratio s/S, and the ratio l/L.

The following describes arrangement of the spacer with reference to the drawings. In the illustrated examples, the spacer is provided on the surface of the separator. However, embodiments of the present disclosure are not limited to such a configuration, and the spacer may be provided on the surface of the electrode.

Figure 5A:
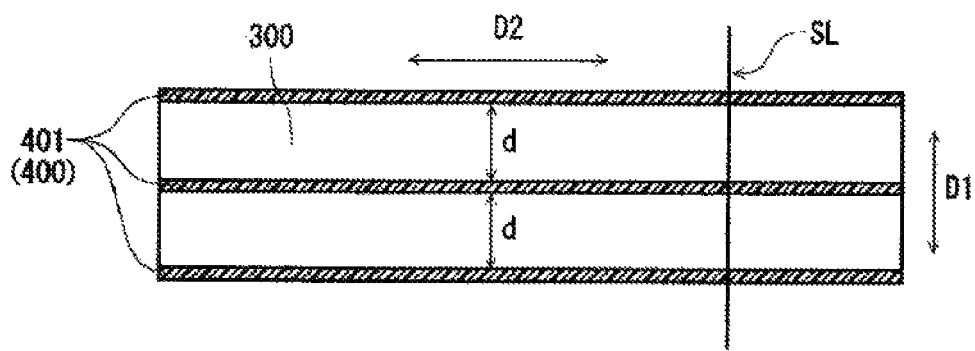
FIG. 5A A schematic plan view of a spacer disposed on a surface of a separator.

FIG. 5A is a schematic plan view of a spacer disposed on the surface of the separator. The spacer 400 includes: line-shaped protrusions 401 extending along the second direction D2 and respectively provided at two ends in the first direction D1 on the surface of the separator 300; and a line-shaped protrusion 401 extending along the second direction D2 midway between the two ends. That is, the spacer 400 is constituted by a total of three substantially parallel line-shaped protrusions 401. Accordingly, a straight line SL drawn along the first direction D1 crosses the spacer 400 at three points. It should be noted that "substantially parallel" means almost parallel, and the line-shaped protrusions 401 may intersect each other at an angle of 0° to 20°, or 0° to 10°, for example.

Figure 5B:
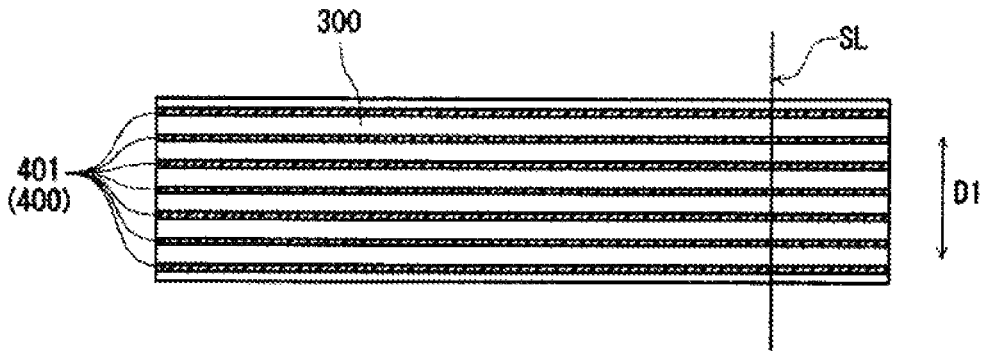
FIG. 5B A schematic plan view of another spacer disposed on a surface of a separator.

FIG. 5B is a schematic plan view of another spacer disposed on the surface of the separator. The spacer 400 is constituted by a plurality of line-shaped protrusions 401 arranged in stripes along the second direction D2 on the surface of the separator 300. In this case, it is possible to draw a straight line SL extending along the first direction D1 and crossing the spacer 400 at the same number of points (in the illustrated example, seven points) as the line-shaped protrusions 401.

Figure 5C:
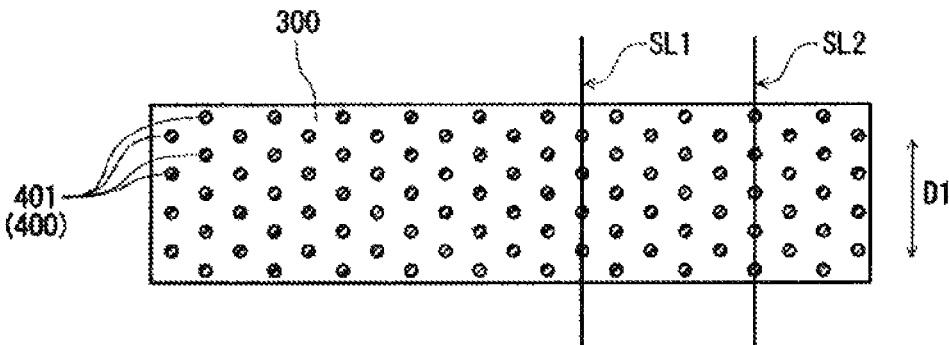
FIG. 5C A schematic plan view of another spacer disposed on a surface of a separator.

FIG. 5C is a schematic plan view of another spacer disposed on the surface of the separator. The spacer 400 is constituted by a plurality of spot-shaped protrusions 401 uniformly distributed on the surface of the separator 300. In the illustrated example, the number of spot-shaped protrusions 401 that a straight line SL drawn along the first direction D1 passes through varies according to the position of the straight line SL. A straight line SL1 passes through four protrusions 401, and a straight line SL2 passes through five protrusions 401. In such a case, it is only required that at least one straight line SL among a plurality of straight lines SL that can be drawn differently from each other passes through three or more protrusions.

Figure 5D:
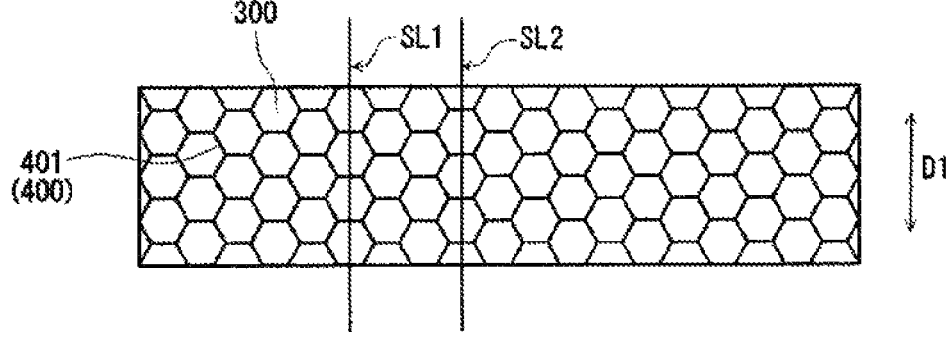
FIG. 5D A schematic plan view of another spacer disposed on a surface of a separator.

FIG. 5D is a schematic plan view of another spacer disposed on the surface of the separator. The spacer 400 is constituted by continuous honeycomb-shaped ribs uniformly distributed on the surface of the separator 300. In this case as well, the number of ribs that a straight line SL drawn along the first direction D1 passes through varies according to the position of the straight line SL. A straight line SL1 passes through the ribs at five points, and a straight line SL2 passes through the ribs at four points.

Figure 5E:
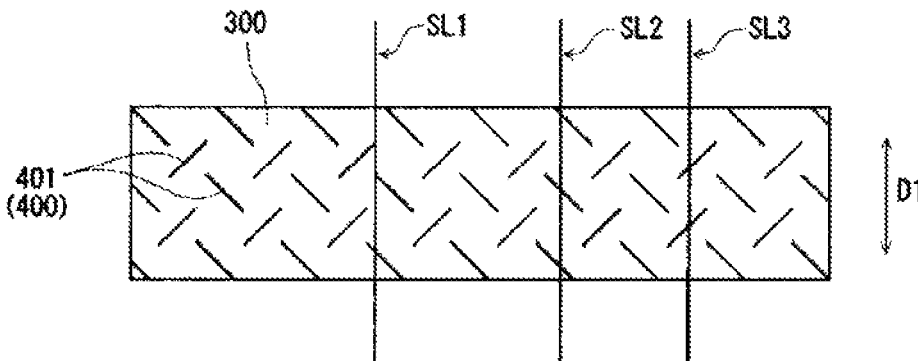
FIG. 5E A schematic plan view of another spacer disposed on a surface of a separator.

FIG. 5E is a schematic plan view of another spacer disposed on the surface of the separator. The spacer 400 is constituted by a plurality of line segment-shaped protrusions 401 uniformly distributed on the surface of the separator 300. The line segment-shaped protrusions 401 are arranged alternately along the first direction D1 so as to intersect each other. In this case as well, the number of line segment-shaped protrusions 401 that a straight line SL drawn along the first direction D1 passes through varies according to the position of the straight line SL. For example, a straight line SL1 passes through three or four protrusions 401, a straight line SL2 passes through three protrusions 401, and a straight line SL3 passes through two protrusions 401.

The following more specifically describes the components of the lithium secondary battery.

[Negative Electrode]

The negative electrode includes a negative electrode current collector. In the lithium secondary battery, lithium metal is deposited on the surface of the negative electrode during charging. Specifically, lithium ions contained in the non-aqueous electrolyte receive electrons on the negative electrode during charging and become lithium metal, which is deposited on the surface of the negative electrode. The lithium metal deposited on the surface of the negative electrode dissolves as lithium ions in the non-aqueous electrolyte during discharging. The lithium ions contained in the non-aqueous electrolyte may be either derived from a lithium salt added to the non-aqueous electrolyte or supplied from a positive electrode active material during charging, or both.

The negative electrode current collector is in the form of an electrically conductive sheet. The conductive sheet may be a foil, film, or the like.

The conductive sheet may have a smooth surface. In this case, lithium metal derived from the positive electrode tends to be uniformly deposited on the conductive sheet during charging. The smooth surface means that the conductive sheet has a maximum height roughness Rz of 20 μm or less. The conductive sheet may have a maximum height roughness Rz of 10 μm or less. The maximum height roughness Rz is measured in accordance with JIS B 0601:2013.

The negative electrode current collector (conductive sheet) is made of an electrically conductive material other than lithium metal and lithium alloys. The conductive material may be a metal material such as a metal or an alloy. The conductive material preferably causes no reaction with lithium. Specifically, a material that forms neither an alloy nor an intermetallic compound with lithium is preferred. Examples of such a conductive material include copper (Cu), nickel (Ni), iron (Fe), an alloy of one or more of these metal elements, and graphite having a basal plane predominately exposed on its surface. Examples of the alloy include a copper alloy and stainless steel (SUS). Among these, copper and/or a copper alloy is preferred because of its high electrical conductivity.

The negative electrode current collector may have any thickness; the thickness is, for example, 5 μm or more and 300 μm or less.

The negative electrode current collector may have a negative electrode mixture layer on its surface. The negative electrode mixture layer is formed by, for example, applying a paste including a negative electrode active material, such as graphite, to at least a part of the surface of the negative electrode current collector. In view of achieving a lithium secondary battery superior in capacity to lithium ion batteries, however, the negative electrode mixture layer is formed sufficiently thin so that lithium metal can be deposited on the negative electrode.

[Positive Electrode]

The positive electrode includes, for example, a positive electrode current collector and a positive electrode mixture layer supported on the positive electrode current collector. The positive electrode mixture layer contains, for example, a positive electrode active material, an electrically conductive material, and a binder. The positive electrode mixture layer may be formed on one surface or both surfaces of the positive electrode current collector. The positive electrode can be obtained by, for example, applying a positive electrode mixture slurry including a positive electrode active material, an electrically conductive material, and a binder to both surfaces of the positive electrode current collector, followed by drying and then rolling the dry applied film.

The positive electrode active material absorbs and releases lithium ions. Examples of the positive electrode active material include a lithium-containing transition metal oxide, a transition metal fluoride, a polyanion, a fluorinated polyanion, and a transition metal sulfide. Preferred among them is a lithium-containing transition metal oxide in terms of its low production cost and high average discharge voltage.

Lithium contained in the lithium-containing transition metal oxide is released as lithium ions from the positive electrode during charging, and is deposited as lithium metal on the negative electrode or the negative electrode current collector. During discharging, the lithium metal dissolves from the negative electrode and lithium ions are released and absorbed by a composite oxide in the positive electrode. In short, lithium ions involved in charge and discharge are mostly derived from a solute in the non-aqueous electrolyte and the positive electrode active material.

Examples of a transition metal element contained in the lithium-containing transition metal oxide include Sc, Ti, V, Cr, Mn, Fe, Co, Ni, Cu, Y, Zr, and W. The lithium-containing transition metal oxide may contain one transition metal element or two or more transition metal elements. The transition metal element may be Co, Ni and/or Mn. The lithium-containing transition metal oxide can contain one or more typical elements, as needed. Examples of typical elements include Mg, Al, Ca, Zn, Ga, Ge, Sn, Sb, Pb, and Bi. The typical element may be Al, for example.

The lithium-containing transition metal oxide is preferably a composite oxide that contains Co, Ni and/or Mn as a transition metal element(s) and Al as an optional component and has a crystal structure like that of rock-salt having a layered structure, in view of achieving a high capacity. In this case, in the lithium secondary battery, a molar ratio mLi/mM of a total amount mLi of lithium present in the positive and negative electrodes to an amount mM of metal M other than lithium present in the positive electrode is set to 1.1 or less, for example.

The conductive material is, for example, a carbon material. Examples of the carbon material include carbon black, acetylene black, Ketjen Black, carbon nanotube, and graphite.

The binder may be, for example, a fluorocarbon resin, polyacrylonitrile, a polyimide resin, an acrylic resin, a polyolefin resin, or a rubbery polymer. Examples of the fluorocarbon resin include polytetrafluoroethylene and polyvinylidene fluoride.

The positive electrode mixture layer has a surface having a maximum height roughness Rz of, for example, 10 μm or less, so that the spacer can be easily disposed on the surface of the positive electrode. The maximum height roughness Rz is measured in accordance with JIS B 0601:2013.

The positive electrode current collector is in the form of an electrically conductive sheet. The conductive sheet may be a foil, film, or the like. The positive electrode current collector may be coated with a carbon material.

The positive electrode current collector (conductive sheet) may be made of, for example, a metal material including Al, Ti, Fe, or the like. The metal material may be Al, an Al alloy, Ti, a Ti alloy, a Fe alloy, or the like. The Fe alloy may be stainless steel (SUS).

The positive electrode current collector may have any thickness: the thickness is, for example, 5 μm or more and 300 μm or less.

[Separator]

The separator is a porous sheet having ion permeability and electrically insulating properties. The porous sheet may be, for example, a microporous thin film, a woven fabric, or a nonwoven fabric. The separator is made of any material; the material may be a polymer material. Examples of the polymer material include an olefin resin, a polyamide resin, and cellulose. Examples of the olefin resin include polyethylene, polypropylene, and an ethylene-propylene copolymer. The separator may include an additive, if necessary. The additive is an inorganic filler, for example.

[Non-Aqueous Electrolyte]

The non-aqueous electrolyte having lithium ion conductivity includes, for example, a non-aqueous solvent, and lithium ions and anions dissolved in the non-aqueous solvent. The non-aqueous electrolyte may be a liquid, or may be a gel.

The liquid non-aqueous electrolyte can be prepared by dissolving a lithium salt in the non-aqueous solvent. When the lithium salt is dissolved in the non-aqueous solvent, lithium ions and anions are produced.

The gel non-aqueous electrolyte includes a lithium salt and a matrix polymer, or includes a lithium salt, a non-aqueous solvent, and a matrix polymer. The matrix polymer is, for example, a polymer material that forms a gel by absorbing the non-aqueous solvent. Examples of the polymer material include a fluorocarbon resin, an acrylic resin, and a polyether resin.

The lithium salt or anions may be any known lithium salt or anions that are used for non-aqueous electrolytes for lithium secondary batteries. Specific examples thereof include $BF_4^-$, $ClO_4^-$, $PF_6^-$, $CF_3SO_3^-$, $CF_3CO_2^-$, imide anions, and oxalate complex anions. Examples of the imide anions include $N(SO_2CF_3)_2^-$ and $N(C_mF_{2m+1}SO_2)_x(C_nF_{2n+1}SO_2)_y^-$, where m and n are independently 0 or an integer of 1 or more, x and y are independently 0, 1, or 2, and x+y=2. The oxalate complex anions may contain boron and/or phosphorus. Examples of the oxalate complex anions include bis(oxalato)borate anions, $BF_2(C_2O_4)^-$, $PF_4(C_2O_4)^-$, and $PF_2(C_2O_4)_2^-$. The non-aqueous electrolyte may include one of these anions, or two or more of them.

In view of suppressing dendritic deposition of lithium metal, the non-aqueous electrolyte preferably includes at least oxalate complex anions. The oxalate complex anions interact with lithium to make lithium metal more likely to be deposited uniformly in a fine particulate state. Therefore, local deposition of lithium metal is unlikely to occur. The oxalate complex anions may be used in combination with one or more other anions, for example, $PF_6^-$ and/or imide anions.

Examples of the non-aqueous solvent include esters, ethers, nitriles, amides, and halogen substituted derivatives of these. The non-aqueous electrolyte may include one of these non-aqueous solvents, or two or more of them. Examples of the halogen substituted derivatives include fluorides.

Examples of the esters include carbonic esters and carboxylic acid esters. Examples of cyclic carbonic esters include ethylene carbonate, propylene carbonate, and fluoroethylene carbonate (FEC). Examples of chain carbonic esters include dimethyl carbonate (DMC), ethyl methyl carbonate (EMC), and diethyl carbonate. Examples of cyclic carboxylic acid esters include γ-butyrolactone and γ-valerolactone. Examples of chain carboxylic acid esters include ethyl acetate, methyl propionate, and methyl fluoropropionate.

Examples of the ethers include cyclic ethers and chain ethers. Examples of the cyclic ethers include 1,3-dioxolane, 4-methyl-1,3-dioxolane, tetrahydrofuran, and 2-methyltetrahydrofuran. Examples of the chain ethers include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethyl ether.

The lithium salt concentration in the non-aqueous electrolyte is, for example, 0.5 mol/L or more and 3.5 mol/L or less. The anion concentration in the non-aqueous electrolyte may be set to 0.5 mol/L or more and 3.5 mol/L or less. The oxalate complex anion concentration in the non-aqueous electrolyte may be set to 0.05 mol/L or more and 1 mol/L or less.

The non-aqueous electrolyte may include an additive. The additive may form a surface film on the negative electrode. When the surface film derived from the additive is formed on the negative electrode, the dendrite formation and growth tend to be suppressed. Examples of the additive include vinylene carbonate, FEC, and vinyl ethyl carbonate (VEC).

[Lithium Secondary Battery]

The following describes a configuration of a lithium secondary battery according to the present disclosure with reference to the drawings, with a cylindrical battery having a wound electrode group taken as an example. However, the present disclosure is not limited to the following configuration.

Figure 6:
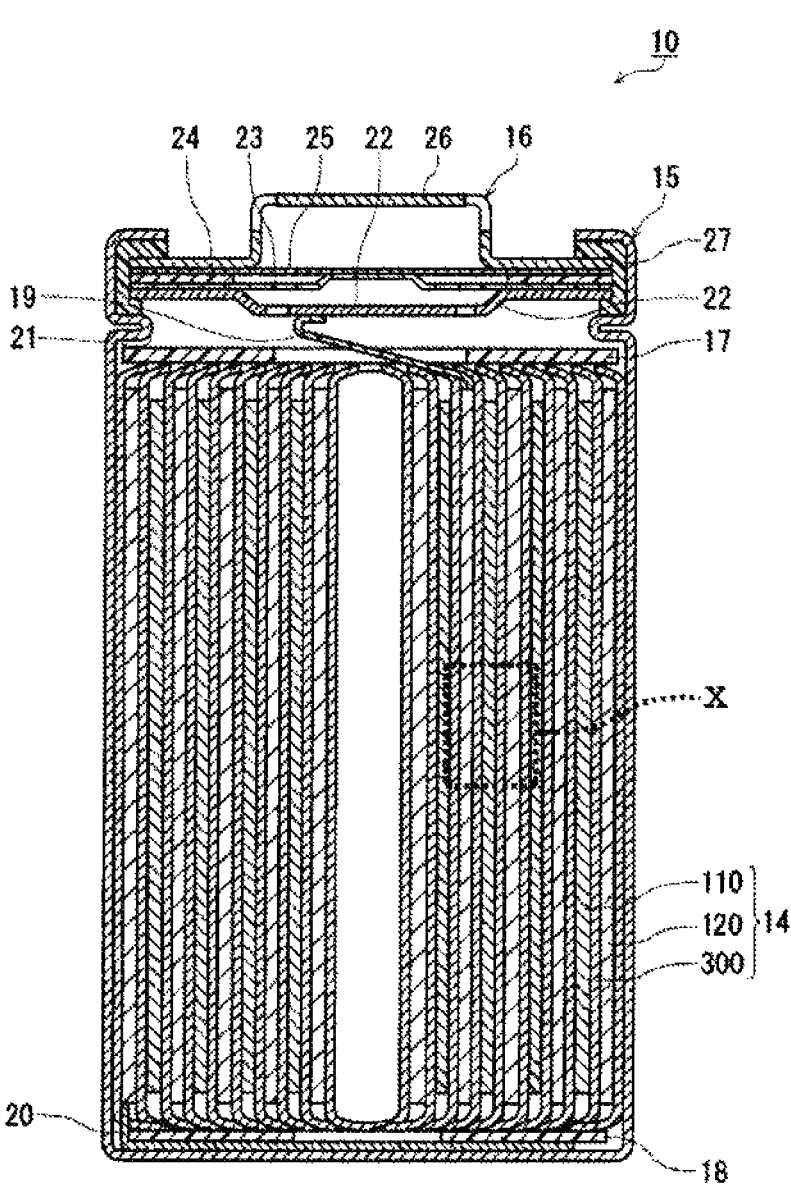
FIG. 6 A schematic longitudinal cross-sectional view of a lithium secondary battery according to one embodiment of the present disclosure.

FIG. 6 is a longitudinal cross-sectional view of a lithium secondary battery 10. The lithium secondary battery 10 is a cylindrical battery that includes a cylindrical battery case, a wound electrode group 14 housed in the battery case, and a non-aqueous electrolyte. The battery case includes a case main body 15, which is a bottomed cylindrical metal container, and a sealing body 16 sealing an opening of the case main body 15. The case main body 15 has an annular step portion 21 formed by partially pressing the sidewall of the case main body from outside in the vicinity of the opening. The sealing body 16 is supported on the opening-side surface of the step portion 21. A gasket 27 is placed between the case main body 15 and the sealing body 16 to secure the hermeticity of the battery case. Within the case main body 15, electrically insulating plates 17 and 18 are placed respectively at two ends of the electrode group 14 in the winding axis direction.

The sealing body 16 includes a filter 22, a lower valve body 23, an electrically insulating member 24, an upper valve body 25, and a cap 26. The cap 26 is disposed outside the case main body 15, and the filter 22 is disposed inside the case main body 15. Center portions of the lower valve body 23 and the upper valve body 25 are connected to each other, and the insulating member 24 is interposed between peripheral portions of the lower valve body 23 and the upper valve body 25. Peripheral portions of the filter 22 and the lower valve body 23 are connected to each other. Peripheral portions of the upper valve body 25 and the cap 26 are connected to each other. The lower valve body 23 is provided with an air vent hole. When the internal pressure of the battery case rises due to abnormal heat generation or other events, the upper valve body 25 bulges toward the cap 26 and is spaced away from the lower valve body 23, which breaks electrical connection between the lower valve body 23 and the upper valve body 25. When the internal pressure further rises, the upper valve body 25 ruptures to let gas escape through an opening provided in the cap 26.

The electrode group 14 includes a positive electrode 110, a negative electrode (negative electrode current collector) 120, and a separator 300. The positive electrode 110, the negative electrode 120, and the separator 300 interposed therebetween all have belt-like shapes and are wound spirally together such that the width direction of each of them is parallel with the winding axis.

The positive electrode 110 is electrically connected via a positive electrode lead 19 to the cap 26 serving as a positive electrode terminal. One end of the positive electrode lead 19 is connected to the positive electrode 110 at somewhere around its center in the longitudinal direction, for example. The other end of the positive electrode lead 19 led out from the positive electrode 110 is passed through a through hole provided in the insulating plate 17 and welded to the inner side surface of the filter 22.

The negative electrode 120 is electrically connected via a negative electrode lead 20 to the case main body 15 serving as a negative electrode terminal. One end of the negative electrode lead 20 is connected to the negative electrode 120 at its end in the longitudinal direction, for example, and the other end of the negative electrode lead 20 is welded to the inner bottom surface of the case main body 15.

Figure 7:
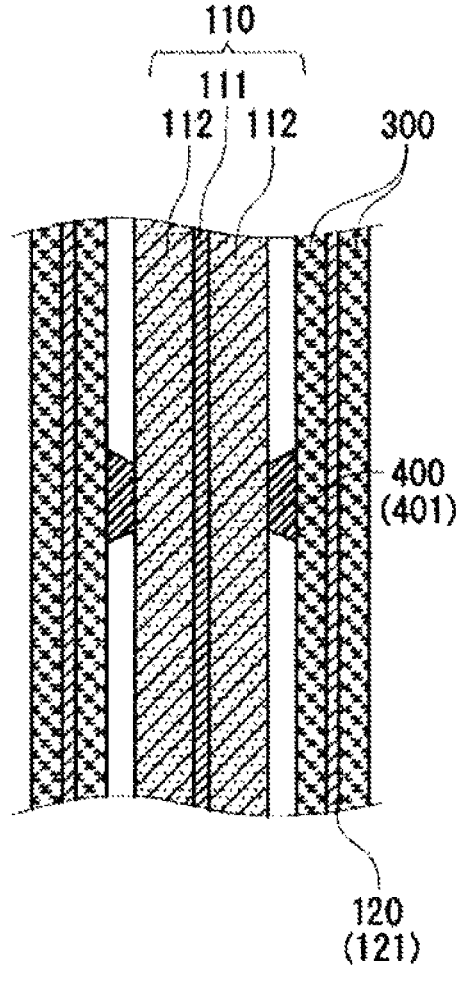
FIG. 7 A schematic enlarged view of an essential part of the lithium secondary battery shown in FIG. 6.

FIG. 7 is a schematic enlarged view of a region X surrounded by a broken line in FIG. 6 in a discharged state. In the illustrated example, the cross-sectional shape of the spacer is a trapezoid. However, embodiments of the present disclosure are not limited to such a configuration, and the cross-sectional shape may be, for example, a rectangle including a curved line forming at least one corner, an ellipse, or a portion of an ellipse. In the illustrated example, the spacer is provided between the positive electrode and the separator. However, embodiments of the present disclosure are not limited to such a configuration, and the spacer may be provided between the negative electrode and the separator, or between the positive electrode and the separator and between the negative electrode and the separator.

The positive electrode 110 includes a positive electrode current collector 111 and a positive electrode mixture layer 112. A spacer 400 is provided between the positive electrode mixture layer 112 and the separator 300. The spacer 400 is constituted by a line-shaped protrusion 401 provided along the second direction D2 (longitudinal direction) of the separator 300. In the discharged state (a), lithium metal is not deposited on a surface of a negative electrode current collector 121, and a space is secured between the positive electrode 110 and the separator 300. On the other hand, in a charged state, lithium metal is deposited on the surface of the negative electrode current collector 121 and stored in the space between the positive electrode 110 and the separator 300 while being subjected to pressing force applied from the separator 300. In short, the negative electrode 120 in the discharged state includes the negative electrode current collector 121, and the negative electrode 120 in the charged state includes the negative electrode current collector 121 and lithium metal deposited thereon.

Since the lithium metal is stored in the space between the positive electrode 110 and the separator 300, apparent changes in the volume of the electrode group associated with the deposition of lithium metal during charge-discharge cycles can be reduced. Accordingly, stress applied to the negative electrode current collector 121 can be suppressed. Moreover, since the separator 300 applies pressure to the lithium metal stored between the positive electrode 110 and the separator 300, the lithium metal is deposited in a controlled manner and is unlikely to be isolated, and a reduction in charge-discharge efficiency can be suppressed.

Although the illustrated example is a cylindrical lithium secondary battery including a wound electrode group, the shape and the like of the lithium secondary battery is not limited thereto, and may be selected according to its use and the like from various shapes such as cylindrical, coin, square, sheet, and flat shapes. The electrode group also may be in any form, and may be in the form of a stack. The components of the lithium secondary battery other than the electrode group and the non-aqueous electrolyte may have any known configuration.

EXAMPLES

The lithium secondary battery according to the present disclosure will be described more specifically with reference to Examples and Comparative Examples. However, the present disclosure is not limited to the following Examples.

Example 1

(1) Production of Positive Electrode

A lithium-containing transition metal oxide (NCA: positive electrode active material) having a layered rock-salt structure and containing Li, Ni, Co, and Al such that the molar ratio of Li to the total of Ni, Co, and Al was 1.0, acetylene black (AB; conductive material), and polyvinylidene fluoride (PVdF; binder) were mixed at a mass ratio of NCA:AB:PVdF=95:2.5:2.5, to which N-methyl-2-pyrrolidone (NMP) was added in an appropriate amount and stirred to prepare a positive electrode mixture slurry. The prepared positive electrode mixture slurry was applied to both surfaces of an Al foil (positive electrode current collector), and then dried and passed between rolls so that the applied film of the positive electrode mixture was rolled. Lastly, the resultant stack of the positive electrode current collector and the positive electrode mixture was cut in a predetermined electrode size to obtain a positive electrode in which a positive electrode mixture layer was formed on both surfaces of the positive electrode current collector.

(2) Formation of Spacer

A separator (microporous film) made of polyethylene was prepared. A polyimide ink was applied to both surfaces of the separator along the second direction D2 at both ends in the first direction D1 and midway between the both ends, and then dried with hot air to form a spacer constituted by three mutually parallel line-shaped protrusions formed of a polyimide resin (Young's modulus: 2 GPa). The polyimide ink was applied using a dispenser. The protrusions each had a width (length L2) of 800 μm.

The protrusions each had a height h of 15 μm. The minimum distance d between adjacent protrusions in the first direction D1 was 12 mm. The ratio (s/S) of an area s of a portion of the positive electrode mixture layer covered by the spacer to an area S of a region in which the positive electrode and the negative electrode faced each other was 0.2. The ratio (l/L) of the length of the spacer to the first length was 0.2.

(3) Production of Negative Electrode

A rectangular electrolytic copper foil (thickness: 15 μm) was prepared as a negative electrode current collector.

(4) Preparation of Non-Aqueous Electrolyte

Ethylene carbonate (EC) and dimethyl carbonate (DMC) were mixed at a volume ratio of EC:DMC=30:70. $LiPF_6$ and $LiBF_2(C_2O_4)$ were dissolved in the resultant mixed solvent at concentrations of 1 mol/L and 0.1 mol/L, respectively, to prepare a liquid non-aqueous electrolyte.

(5) Fabrication of Battery

The positive electrode and the negative electrode current collector were spirally wound in an inert gas atmosphere with the separator described above interposed therebetween, to form an electrode group. Lithium contained in the electrode group was all derived from the positive electrode. Therefore, a molar ratio mLi/mM of a total amount mLi of lithium present in the positive and negative electrodes to an amount mM of metal M (here, Ni, Co, and Al) present in the positive electrode was 1.0.

The electrode group was housed in a pouch-like outer case formed of a laminate sheet including an Al layer, and the non-aqueous electrolyte was injected into the outer case. Thereafter, the outer case was sealed to complete a lithium secondary battery A1.

In a reference cross section obtained by cutting the electrode group, the protrusions each had an approximately trapezoidal cross-sectional shape. A contact length L2 between the separator and the spacer was longer than a contact length L1 between the spacer and the positive/negative electrode, and the ratio L1/L2 was 0.88. The larger one of two first angles θ1 was 137°. The smaller one of two second angles θ2 was 43°.

Example 2

A battery A2 was produced similarly to Example 1, except that a trapezoidal spacer was formed such that the ratio L1/L2 between the contact length L2 between the separator and the spacer and the contact length L1 between the spacer and the positive/negative electrode was 0.56. The larger one of two first angles θ1 was 172°. The smaller one of two second angles θ2 was 8°.

Comparative Example 1

A battery B1 was produced similarly to Example 1, except that a spacer was formed by attaching a polyethylene tape (thickness: about 30 μm) to the separator in "(2) Formation of spacer". In a reference cross section obtained by cutting the electrode group, each protrusion had a rectangular cross-sectional shape of which corner portions were not rounded. Two first angles θ1 and two second angles θ2 were all 90°.
[Evaluation]

The obtained batteries were subjected to a charge-discharge test for evaluation.

In the charge-discharge test of each Example, three batteries were charged under conditions described below, left to stand for 20 min, and then discharged under conditions described below. This cycle was repeated 100 cycles in a constant-temperature bath at 25° C. The ratio (MR40) of the discharge capacity at the 40th cycle to the discharge capacity at the 1st cycle was determined as the capacity retention rate (%).
(Charge)

Constant-current charging was performed until the battery voltage reached 4.3 V at a current of 10 mA per unit area (square centimeters) of the electrode, and then constant-voltage charging was performed at a voltage of 4.3 V until the current value per unit area of the electrode reached 1 mA.
(Discharge)

Constant-current discharging was performed until the battery voltage reached 3.0 V at a current of 10 mA per unit area of the electrode.

The number of cycles that had been performed until a cycling failure occurred in any of the three batteries, presumably because of a crack in the negative electrode current collector, was determined. When the cycling failure occurred in at least one of the batteries, the MR40 was determined as the average of the values of the remaining batteries.

TABLE 1

| Battery | First angle | Second angle | L1/L2 | Failure cycle | MR40 (%) |
|---|---|---|---|---|---|
| A1 | 137° | 43° | 0.88 | 78 | 74 |
| A2 | 172° | 8° | 0.56 | 62 | 68 |
| B1 | 90° | 90° | 1.0 | 48 | 51 |

In the cases of the batteries A1 and A2, the number of cycles that had been performed until a cycling failure occurred was large, and the capacity retention rate was high.

On the other hand, in the case of the battery B1, the number of cycles that had been performed until a cycling failure occurred was small, and the capacity retention rate was low.

INDUSTRIAL APPLICABILITY

The lithium secondary battery of the present disclosure is applicable to electronic devices such as cellular phones, smart phones, and tablet terminals, electric vehicles including hybrids and plug-in hybrids, and home storage battery systems combined with a solar cell.

REFERENCE SIGNS LIST

10 lithium secondary battery
14 electrode group
15 case main body
16 sealing body
17, 18 insulating plate
19 positive electrode lead
20 negative electrode lead
21 step portion
22 filter
23 lower valve body
24 insulating member
25 upper valve body
26 cap
27 gasket
100 electrode
110 positive electrode
111 positive electrode current collector
112 positive electrode mixture layer
120 negative electrode
121 negative electrode current collector
300 separator
400 spacer
401 protrusion

The invention claimed is:
1. A lithium secondary battery comprising:
a positive electrode;
a negative electrode;
a separator disposed between the positive electrode and the negative electrode; and
a non-aqueous electrolyte having lithium ion conductivity, wherein
lithium metal is deposited on the negative electrode during charging, and dissolves from the negative electrode during discharging,
a spacer is provided between the separator and at least one of the positive electrode and the negative electrode, the spacer including a plurality of protrusions formed on a surface of the separator,
a first length of the separator in a first direction D1 is shorter than a second length of the separator in a second direction D2 intersecting the first direction D1,
in a cross section of the spacer taken along a thickness direction of the separator and the first direction D1, a spacer-side angle between the protrusion spacer and the electrode in contact with the protrusion spacer is greater than 90°, and
configured such that a straight line SL extending along the first direction D1 and crossing the spacer three or more times can be drawn when viewed in a normal direction of a main surface of the separator.

2. The lithium secondary battery according to claim 1, wherein the cross section of the spacer includes a curved line that is in contact with at least one of the separator and the electrode.

3. The lithium secondary battery according to claim 2, wherein a radius of curvature of the curved line at an intersection between the curved line and the separator or the electrode is greater than or equal to half a longer contact length out of a contact length between the electrode and the spacer and a contact length between the separator and the spacer.

4. The lithium secondary battery according to claim 1, wherein, in the cross section of the spacer, a contact length between the separator and the spacer and a contact length between the electrode and the spacer are 500 μm or more and 2000 μm or less.

5. The lithium secondary battery according to claim 1, wherein, in the cross section of the spacer, a contact length between the electrode and the spacer is different from a contact length between the separator and the spacer.

6. The lithium secondary battery according to claim 5, wherein, when one of the contact lengths is referred to as a length L1 and the other contact length that is longer than the length L1 is referred to as a length L2, a ratio L1/L2 between the length L1 and the length L2 is 0.5 or more and 0.95 or less.

7. The lithium secondary battery according to claim 5, wherein the contact length between the separator and the spacer is longer than the contact length between the electrode and the spacer.

8. The lithium secondary battery according to claim 1, wherein a cross-sectional shape of the spacer in the cross section is a rectangle including a curved line forming at least one corner, a trapezoid, an ellipse, or a portion of an ellipse.

9. The lithium secondary battery according to claim 8, wherein the cross-sectional shape of the spacer is a portion of an ellipse, and a relationship of θ≥2×θe is satisfied, where, among the positive electrode, the negative electrode, and the separator, a first member is in contact with an arc of the cross-sectional shape of the spacer and a second member is in contact with a chord of the cross-sectional shape of the spacer, a contact angle θ is a spacer-side angle between the second member and a tangent of the arc at an intersection between the arc and the second member, and an elevation angle θe is a spacer-side angle between the second member and a straight line connecting the intersection between the arc and the second member and a middle point in a contact portion between the first member and the spacer.

10. The lithium secondary battery according to claim 8, wherein the cross-sectional shape of the spacer is a portion of an ellipse, and a maximum diameter L3 of the cross section in a direction extending along a surface of the separator is 500 μm or more and 2000 μm or less.

11. The lithium secondary battery according to claim 8, wherein the cross-sectional shape of the spacer is a portion of an ellipse, and a maximum diameter L3 of the cross section in a direction extending along a surface of the separator is greater than a contact length between the separator and the spacer and a contact length between the electrode and the spacer.

12. The lithium secondary battery according to claim 8, wherein the cross-sectional shape of the spacer is the rectangle, and a radius of curvature of the curved line is greater than or equal to three times a longer contact length out of a contact length between the electrode and the spacer and a contact length between the separator and the spacer.

13. The lithium secondary battery according to claim 1, wherein the spacer has a height of 15 μm or more and 60 μm or less.

14. The lithium secondary battery according to claim 1, wherein the non-aqueous electrolyte includes lithium ions and anions, and the anions include at least oxalate complex anions.

15. The lithium secondary battery according to claim 1, wherein, when viewed in a normal direction of the main surface of the separator, a ratio s/S between an area S of a region of the positive electrode overlapping the negative electrode and an area s of the spacer arranged between the positive electrode and the negative electrode is 0.05 or more and 0.2 or less.

16. The lithium secondary battery according to claim 1, wherein, when viewed in a normal direction of the main surface of the separator, a ratio d/h between the minimum distance d (μm) between adjacent portions of the spacer along the straight line SL and the height h (μm) of the spacer in a normal direction of a main surface of the separator is 10 or more and 800 or less.

17. The lithium secondary battery according to claim 1, wherein, when viewed in a normal direction of the main surface of the separator, a ratio 1/L of a length 1 of portions of the straight line SL occupied by the spacer to the first length of the separator in the first direction D1 is 0.05 or more and 0.2 or less.

18. The lithium secondary battery according to claim 1, wherein plurality of protrusions are spot-shaped.

\*   \*   \*   \*   \*